United States Patent
Hachiuma et al.

(10) Patent No.: US 10,406,618 B2
(45) Date of Patent: Sep. 10, 2019

(54) CUTTING TAP

(71) Applicant: SAKAI THREADING TOOL CO., LTD., Osaka (JP)

(72) Inventors: Yoshio Hachiuma, Hyogo (JP); Hitoshi Yamaguchi, Hyogo (JP)

(73) Assignee: SAKAI THREADING TOOL CO., LTD., Osaka (JP)

( * ) Notice: Subject to any disclaimer, the term of this patent is extended or adjusted under 35 U.S.C. 154(b) by 344 days.

(21) Appl. No.: 15/313,720

(22) PCT Filed: Mar. 24, 2015

(86) PCT No.: PCT/JP2015/058868
§ 371 (c)(1),
(2) Date: Nov. 23, 2016

(87) PCT Pub. No.: WO2016/038912
PCT Pub. Date: Mar. 17, 2016

(65) Prior Publication Data
US 2017/0189979 A1    Jul. 6, 2017

(30) Foreign Application Priority Data
Sep. 8, 2014    (JP) .................. 2014-182206

(51) Int. Cl.
*B23G 5/06* (2006.01)
*B23G 5/20* (2006.01)

(52) U.S. Cl.
CPC ............... *B23G 5/06* (2013.01); *B23G 5/20* (2013.01); *B23G 2200/141* (2013.01); *B23G 2200/146* (2013.01); *B23G 2200/34* (2013.01)

(58) Field of Classification Search
CPC ............... B23G 5/06; B23G 2200/141; B23G 2200/146
(Continued)

(56) References Cited

U.S. PATENT DOCUMENTS

| 1,725,233 | A | * | 8/1929 | Walker | ..... | B23G 5/06 |
| | | | | | | 408/217 |
| 1,968,103 | A | * | 7/1934 | Thomson | ..... | B23G 5/06 |
| | | | | | | 408/217 |

(Continued)

FOREIGN PATENT DOCUMENTS

| CN | 202845970 | 4/2013 |
| CN | 103506716 | 1/2014 |

(Continued)

OTHER PUBLICATIONS

Extended European Search Report dated Sep. 4, 2017 in European Application No. 15840509.2.
(Continued)

*Primary Examiner* — Shelley M Self
*Assistant Examiner* — Jared O Brown
(74) *Attorney, Agent, or Firm* — Wenderoth, Lind & Ponack, L.L.P.

(57) ABSTRACT

A cutting tap includes thread ridges, roots formed between the respective axially adjacent pairs of thread ridges, and a plurality of deburring thread grooves arranged at a constant pitch toward the axial front side of the cutting tap from the rearmost ones of the roots in which the deburring thread grooves are formed, and formed such that a groove bottom diameter of the deburring thread grooves gradually decreases toward the axial front side of the cutting tap. The respective deburring thread grooves have groove bottom diameter reliefs by which the groove bottom dimeter gradually decreases from the front side toward the rear side of each deburring thread groove in the rotation direction of the cutting tap, the groove bottom diameter reliefs being set to be larger than effective diameter reliefs of the thread grooves.

4 Claims, 7 Drawing Sheets

(58) Field of Classification Search
USPC .......................................................... 470/198
See application file for complete search history.

(56) References Cited

U.S. PATENT DOCUMENTS

| | | | | |
|---|---|---|---|---|
| 3,125,772 A | * | 3/1964 | Beck .................. | B23G 5/04 |
| | | | | 408/218 |
| 3,355,752 A | * | 12/1967 | Haralampiev ........... | B23G 5/06 |
| | | | | 408/220 |
| 9,481,044 B2 | * | 11/2016 | Kaufmann ............... | B23G 5/18 |

FOREIGN PATENT DOCUMENTS

| | | | | |
|---|---|---|---|---|
| CN | 203459782 | | 3/2014 | |
| DE | 473 066 | | 3/1929 | |
| DE | 848 899 | | 9/1952 | |
| FR | 400 566 | | 7/1909 | |
| FR | 705837 A | * | 6/1931 | ............... B23G 5/06 |
| GB | 1 045 794 | | 10/1966 | |
| JP | 57-189735 | | 12/1982 | |
| JP | 1-148229 | | 10/1989 | |
| JP | 3-88627 | | 9/1991 | |
| JP | 03-88627 U | * | 9/1991 | ............... B23G 5/06 |
| JP | 9-76121 | | 3/1997 | |
| JP | 2010-46758 | | 3/2010 | |
| JP | 2012-61577 | | 3/2012 | |
| WO | 2013/124981 | | 8/2013 | |

OTHER PUBLICATIONS

International Preliminary Report on Patentability with Written Opinion of the International Searching Authority dated Mar. 14, 2017 in corresponding (PCT) International Application No. PCT/JP2015/058868.

Office Action dated Jan. 30, 2018 in Chinese Application No. 201580027208.5, with English translation of Search Report.

International Search Report dated May 19, 2015 in International (PCT) Application No. PCT/JP2015/058868.

* cited by examiner

CUTTING TAP

TECHNICAL FIELD

The present invention relates to a cutting tap capable of forming an internal thread by cutting.

BACKGROUND ART

For example, when a nut is manufactured, a nut blank formed with a prepared hole for an internal thread is first prepared, and then an internal thread is formed in the inner periphery of the prepared hole. Since such a prepared hole is generally formed by forging or pressing, a sheared surface and a broken surface tends to arise in the inner periphery of the prepared hole, so that the inner periphery of the prepared hole may slightly vary due to the sheared and broken surfaces. Therefore, when an internal thread is formed by a normal cutting tap having no reamer portion, the inner periphery of the internal thread may vary (i.e., the inner peripheries of the crests of the thread ridges on the internal thread may not be uniform) due to sheared and broken surfaces, thereby making it impossible to obtain required accuracy in the internal thread.

In order to overcome such a problem, Japanese Unexamined Utility Model Application Publication No. H01-148229 (hereinafter, JP H01-148229) proposes a cutting tap capable of forming an internal thread with high accuracy even when a prepared hole for the internal thread has an inner periphery of which the dimensional accuracy is low.

The cutting tap of JP 1101-148229 includes a cutting portion, and a complete thread portion continuous with the axial rear side of the cutting portion. The cutting portion comprises a plurality of thread ridges formed such that with the effective diameter of the thread ridges uniform in the axial direction, the major diameter of the thread ridges gradually decreases toward the axial front side of the cutting portion. The complete thread portion comprises a plurality of thread ridges having a complete shape, and formed such that the effective diameter and the major diameter of the thread ridges are made uniform in the axial direction. The thread ridges of the cutting portion and the complete thread portion are arranged at a constant pitch in the axial direction.

The cutting tap of JP 1101-148229 is configured such that the root diameter of roots formed between the respective adjacent pairs of thread ridges of the cutting portion is different from that of roots formed between the respective adjacent pairs of thread ridges of the complete thread portion. Specifically, the root diameter of the complete thread portion is larger than that of the cutting portion. Due to this configuration, after the thread ridges of the cutting portion cut the inner periphery of a prepared hole such that an internal thread is formed in the prepared hole, the roots formed between the respective adjacent pairs of thread ridges of the complete thread portion thinly cut the crests of the thread ridges of the internal thread (cut portion corresponding to the inner peripheral surface of the prepared hole).

The inventors of the present application experimentally prepared a cutting tap as disclosed in JP H01-148229, and performed an experiment to actually form an internal thread by use of this cutting tap. As a result of this experiment, it turned out that torque required for cutting is too large, and thus the cutting tap of JP H01-148229 is not practical.

Generally, respective thread ridges on the outer periphery of a cutting tap have effective diameter reliefs by which the effective diameter of the thread ridges gradually decreases from the front side toward the rear side of each thread ridge in the rotation direction of the cutting tap, the effective diameter reliefs being set at 0 (zero) or a minute value. The reason why the effective diameter reliefs are set at 0 (zero) or a minute value is because if the effective diameter reliefs are set at a large value, the cutting tap will not be able to be guided accurately, so that the thread ridges of the internal thread will be deformed (i.e., expanded).

Thread ridges on the outer periphery of a cutting tap are reflexively formed by removing, from the material of the cutting tap (tap blank), portions corresponding to the thread grooves between the respective adjacent pairs of thread ridges. Roots formed between the respective adjacent pairs of thread ridges on the outer periphery of the cutting tap have root diameter reliefs by which the root diameter of the roots gradually decreases from the front side toward the rear side of each root in the rotation direction of the cutting tap. The root diameter reliefs are set to be equal to the effective diameter reliefs of the thread ridges, namely, set at 0 (zero) or a minute value.

Therefore, as in JP H01-148229, when the inner periphery of the prepared hole for an internal thread is cut by the roots formed between the respective adjacent pairs of thread ridges on the outer periphery of the cutting tap, with no radial gaps or substantially no radial gaps defined between the inner periphery of the prepared hole and the roots between the respective adjacent pairs of thread ridges on the outer periphery of the cutting tap, the cutting tap is rotated relative to the prepared hole, so that its rotational resistance is made large. Specifically, if the cutting tap cuts the inner periphery of the prepared hole with an extremely small cutting stock (e.g., if the cutting stock is 0.05 mm or less in diameter), the cutting tap barely can form an internal thread in the prepared hole. However, if the cutting tap forms an internal thread with a cutting stock having more than 0.05 mm (e.g. 0.1 mm or over), the rotational resistance of the cutting tap is made extremely large.

Therefore, for example, if a step having 0.05 mm or over in diameter is formed on the inner periphery of the prepared hole for an internal thread (specifically, if the inner diameter of the prepares hole varies midway by 0.1 mm or over), the cutting tap of JP H01-1482291 is unable to form an internal thread with high accuracy in such a prepared hole.

It is an object of the present invention to provide a cutting tap capable of forming an internal thread with high accuracy even when the prepared hole for the internal thread has an inner periphery of which the dimensional accuracy is low.

SUMMARY OF THE INVENTION

In order to achieve the above object, the present invention provides a cutting tap comprising: a plurality of thread ridges arranged at a constant pitch in an axial direction, and formed such that with an effective diameter of the thread ridges uniform in the axial direction, a major diameter of the thread ridges gradually decreases toward an axial front side of the cutting tap; and roots formed between the respective axially adjacent pairs of thread ridges. The respective thread ridges have effective diameter reliefs by which the effective diameter gradually decreases from a front side toward a rear side of each of the thread ridges in a rotation direction of the cutting tap, and the effective diameter reliefs being set at zero or a minute value. The respective roots have root diameter reliefs by which a root diameter of the roots gradually decreases from a front side toward a rear side of each of the roots in the rotation direction of the cutting tap, the root diameter reliefs being set to be equal to the effective diameter reliefs. The cutting tap further comprises a plurality of deburring thread grooves formed in some or all of the roots at a constant pitch toward the axial front side of the cutting tap from rearmost ones of some or all of the roots such that a groove bottom diameter of the deburring thread grooves gradually decreases toward the axial front side of the cutting tap. The respective deburring thread grooves have groove bottom diameter reliefs by which the groove bottom dimeter gradually decreases from a front side toward a rear side of each of the deburring thread grooves in the rotation direction of the cutting tap, the groove bottom diameter reliefs being set to be larger than the effective diameter reliefs of the thread grooves.

With this arrangement, when the cutting tap is axially advanced while being rotated, the deburring thread grooves deburr/cut the inner periphery of a prepared hole for an internal thread, thereby forming surfaces corresponding to the crests of the thread ridges of the internal thread. Since the groove bottom diameter reliefs of the deburring thread grooves are larger than the effective diameter reliefs of the thread ridges of the cutting tap, the rotational resistance of the cutting tap is not made extremely large. As a result thereof, the cutting tap can cut the inner periphery of the prepared hole with a relatively large cutting stock, and thus can form an internal thread with high accuracy even when the prepared hole has an inner periphery of which the dimensional accuracy is low.

Each of the deburring thread grooves may comprise a V groove having a V-shaped cross section such that a step is formed relative to a surface of the corresponding one of the roots. By using such V grooves as the deburring thread grooves, when the cutting tap is manufactured, it is possible to separately form the deburring thread grooves, and the flanks of the thread ridges on the outer periphery of the cutting tap. Therefore, it is possible to easily form the deburring thread grooves such that the groove bottom diameter reliefs of the thread grooves are made larger than the effective diameter reliefs of the thread ridges.

The deburring thread grooves may be arranged and shaped such that the closer the deburring thread grooves are located to the axial front side of the cutting tap, the deeper the deburring thread grooves are relative to the roots.

Effects of the Invention

The cutting tap of the present invention is configured such that when the cutting tap is axially advanced while being rotated, the deburring thread grooves deburr/cut the inner periphery of the prepared hole for an internal thread. Since the groove bottom diameter reliefs of the deburring thread grooves are larger than the effective diameter reliefs of the thread ridges, the rotational resistance of the cutting tap is not made extremely large. As a result thereof, the cutting tap can cut the inner periphery of the prepared hole with a relatively large cutting stock, and thus can form an internal thread with high accuracy even when the prepared hole has an inner periphery of which the dimensional accuracy is low.

DETAILED DESCRIPTION OF THE INVENTION

Figure 1:
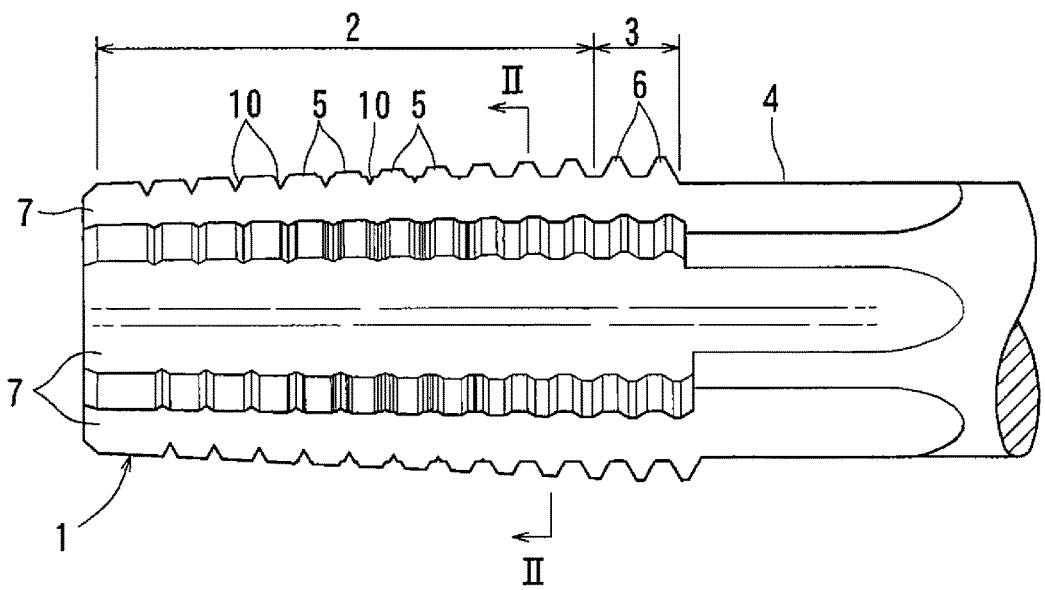
FIG. 1 is a front view of a cutting tap according to an embodiment of the present invention.

FIG. 1 illustrates a cutting tap 1 according to the embodiment of the present invention. This cutting tap 1 is a nut tap used for manufacturing nuts in a tapping machine, and includes a cutting portion 2 formed such that the outer diameter of the cutting portion 2 gradually decreases toward the axial front side of the cutting portion 2, a complete thread portion 3 formed such that the outer diameter of the complete thread portion 3 is uniform in the axial direction, and a columnar shank 4. The complete thread portion 3 is continuous with the axial rear side of the cutting portion 2. The shank 4 is continuous with the axial rear side of the complete thread portion 3.

Figure 2:
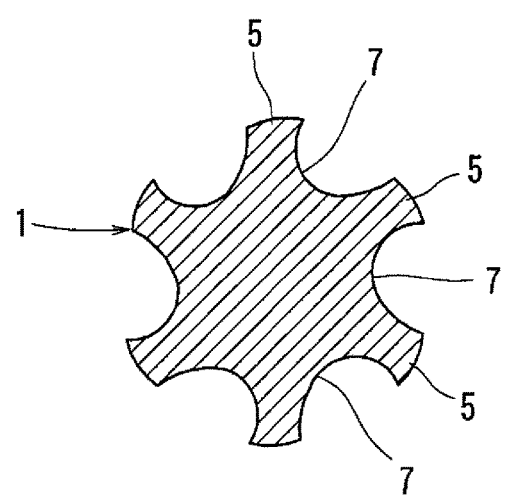
FIG. 2 is a sectional view taken along line II-II of FIG. 1.

The cutting portion 2 is formed with a plurality of thread ridges 5 arranged at a constant pitch in the axial direction. The complete thread portion 3 is formed with a plurality of thread ridges 6 arranged at a constant pitch in the axial direction. The cutting tap 1 is formed in its outer periphery with a plurality of grooves 7 extending from the axial front end of the cutting tap 1 to the shank 4 through the cutting portion 2 and then the complete thread portion 3 so as to circumferentially divide a single thread into the thread ridges 5 of the cutting portion 2 and the thread ridges 6 of the complete thread portion 3. A cutting edge is constituted by the ridgeline at which the surface of each thread ridge 5 intersects with the inner surface of one of the grooves 7. As illustrated in FIG. 2, the grooves 7 are circumferentially spaced apart from each other at regular intervals.

Figure 3:
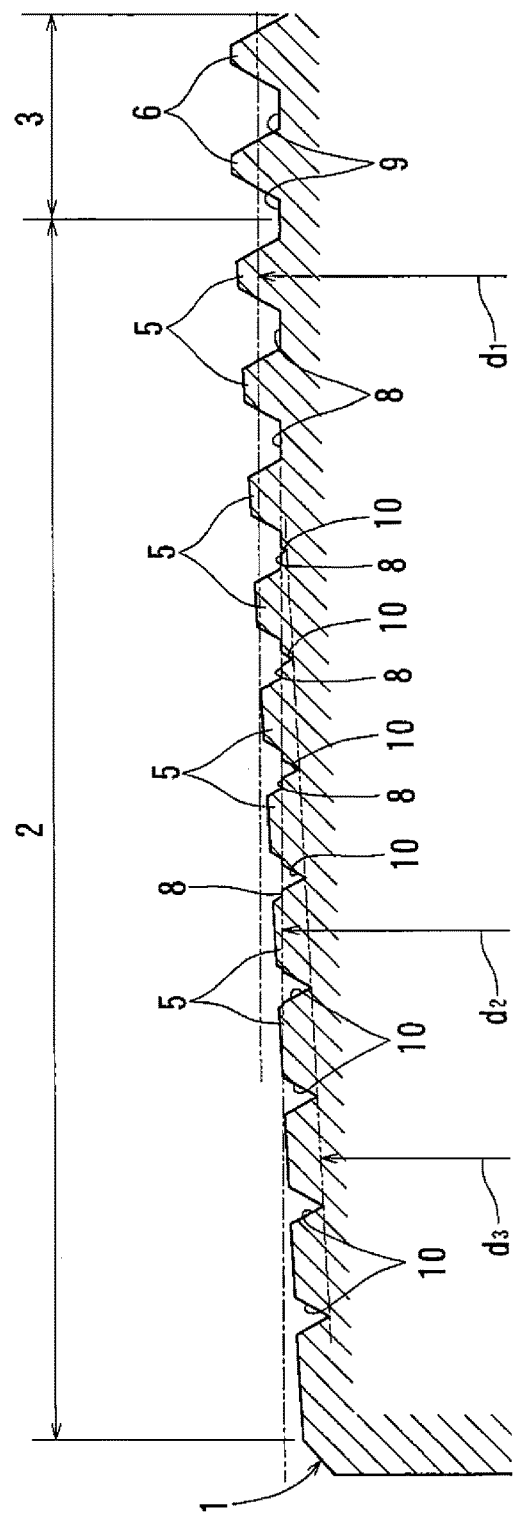
FIG. 3 is an enlarged sectional view of a cutting portion and a complete thread portion of the cutting tap illustrated in FIG. 1.

As illustrated in FIG. 3, the thread ridges 5 of the cutting portion 2 have an incomplete shape, that is, the crests of the thread ridges 5 are obliquely cut such that the major diameter of the thread ridges 5 gradually decreases toward the axial front side of the cutting portion 2. The effective diameter $d_1$ of the thread ridges 5 is uniform in the axial direction. As illustrated in FIG. 2, the crests of the respective thread ridges 5 of the cutting portion 2 have major diameter reliefs such that the major diameter of the thread ridges 5 gradually decreases from the front (leading) side to the rear (trailing) side of each thread ridge 5 in the rotation direction of the cutting tap 1. (In FIG. 2, the cutting tap 1 rotates in the clockwise direction, so that the major diameter decreases in the counterclockwise direction at each thread ridge 5.) In order to ensure sharpness of the crests of the thread ridges 5, the major diameter reliefs of the thread ridges 5 are set to be larger than the below-described effective diameter $d_1$ reliefs of the thread ridges 5.

The effective diameter $d_1$ of the thread ridges 5 corresponds to the diameter of an imaginary cylinder (or cone) that passes through the portions of the thread ridges where their widths are equal to the widths of thread grooves formed between the respective axially adjacent pairs of thread ridges 5. Though it is described above that "the effective diameter $d_1$ of the thread ridges 5 is uniform in the axial direction", the effective diameter $d_1$ thereof does not need to be uniform in a strict sense. More specifically, in order to reduce cutting resistance when forming an internal thread, the imaginary cylinder (or cone) having the effective diameter $d_1$ may be slightly tapered or inclined (by about $1/1000$ to $3/1000$) such that the effective diameter $d_1$ decreases from the axial front side of the cutting portion 2 toward the axial rear side thereof.

As illustrated in FIG. 3, the thread ridges 6 of the complete thread portion 3 have a complete shape, that is, the outer diameter of the complete thread portion 3 is uniform in the axial direction. The effective diameter of the thread ridges 6 of the complete thread portion 3 is uniform in the axial direction, and equal to the effective diameter $d_1$ of the thread ridges 5 of the cutting portion 2. In order to enable the cutting tap 1 to be accurately guided, the respective thread ridges 6 have major diameter reliefs (i.e., reliefs by which the major diameter of the thread ridges 6 gradually decrease from the front (leading) side toward the rear (trailing) side of each thread ridge 6 in the rotation direction of the cutting tap 1) that are set at 0 (zero) or a minute value.

The cutting portion 2 has a root 8 between each axially adjacent pair of the thread ridges 5. Each root 8 has a cross section extending straight in the axial direction, and both ends connected to respective flanks of the corresponding pair of the thread ridges 5. The complete thread portion 3 is also formed with a root 9 similar to the root 8, between each axially adjacent pair of the thread ridges 6. The root diameter $d_2$ of the cutting portion 2 is uniform in the axial direction. The root diameter of the complete thread portion 3 is uniform in the axial direction, and equal to the root diameter $d_2$ of the cutting portion 2.

The thread ridges 5 of the cutting portion 2 and the thread ridges 6 of the complete thread portion 5 have effective diameter $d_1$ reliefs by which the effective diameter $d_1$ gradually decreases from the front (leading) side toward the rear (trailing) side of each thread ridge in the rotation direction of the cutting tap 1, the effective diameter $d_1$ reliefs being set at 0 (zero) or a minute value. The reason why the effective diameter $d_1$ reliefs are set at 0 (zero) or a minute value is because if the effective diameter $d_1$ reliefs are set at a large value, when the cutting tap 1 is used to form an internal thread, the cutting tap 1 will not be able to be guided accurately, so that the thread ridges of the internal thread will be deformed (i.e., expanded).

The roots 8, formed between the respective adjacent pairs of thread ridges 5 of the cutting portion 2, have root diameter $d_2$ reliefs by which the root diameter $d_2$ gradually decreases from the front (leading) side toward the rear (trailing) side of each root 8 in the rotation direction of the cutting tap 1. The root diameter $d_2$ reliefs are set to be equal to the effective diameter $d_1$ reliefs of the thread ridges 5, namely, set at 0 (zero) or a minute value.

The cutting portion 2 is formed with a plurality of deburring thread grooves 10 in some of the roots 8, formed between the respective axially adjacent pairs of thread ridges 5. The deburring thread grooves 10 are arranged at a constant pitch toward the axial front side of the cutting portion 2 from the rearmost ones of the roots 8 in which the deburring thread grooves 10 are formed. The pitch of the deburring thread grooves 10 is set such that each deburring thread groove 10 is located between the corresponding adjacent pair of the thread ridges 5, and does not necessarily need to be equal to the pitch of the thread ridges 5. However, it is preferable that the pitch of the deburring thread grooves 10 is set to be equal to the pitch of the thread ridges 5, because by setting in this way, the deburring thread grooves 10 can be reliably located between respective adjacent pairs of the thread ridges 5. The deburring thread grooves 10 are formed such that the groove bottom diameter $d_3$ of the deburring thread grooves 10 (which corresponds to the diameters of the deepest portions of the respective thread grooves 10 in the cross section along the center axis of the cutting tap 1) gradually decreases toward the axial front side of the cutting portion 2. Similar deburring thread grooves 10 are also formed at a constant pitch in the areas located axially forward of the frontmost thread ridges 5 at the axial front end of the cutting portion 2. Though this embodiment exemplifies that the rearmost deburring thread grooves 10 at the axial rear end of the cutting portion 2 (i.e., the deburring thread grooves 10 in which the groove bottom diameter $d_3$ is the largest) are arranged in roots 8 located midway in the cutting portion 2, the rearmost deburring thread grooves 10 may be located in roots 9, i.e., the roots formed between respective adjacent pairs of the thread ridges 6.

Figure 4:
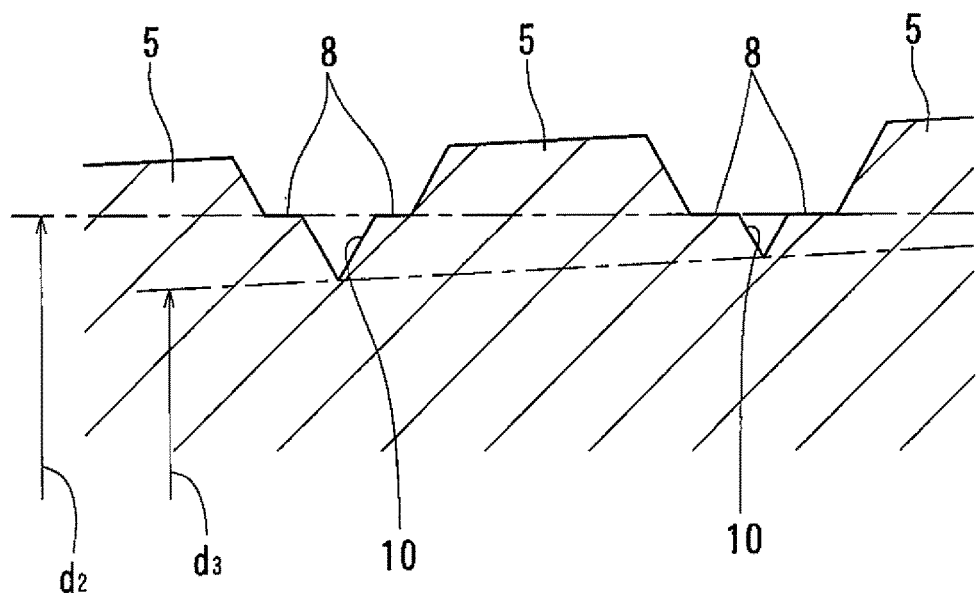
FIG. 4 is an enlarged sectional view illustrating the vicinity of deburring thread grooves formed between respective adjacent pairs of thread ridges of the cutting portion of FIG. 3.

As illustrated in FIG. 4, the deburring thread grooves 10, formed between respective adjacent pairs of some of the thread ridges 5, are formed such that the closer the deburring thread grooves 10 are located to the axial front side of the cutting portion 2, the deeper the deburring thread grooves 10 are relative to the roots 8. Each deburring thread groove 10 comprises a V groove having a V-shaped cross section such that a step or steps are formed relative to the surface of the corresponding root 8.

The deburring thread grooves 10 have groove bottom diameter $d_3$ reliefs by which the groove bottom diameter $d_3$ gradually decreases from the front (leading) side toward the rear (trailing) side of each deburring thread groove 10 in the rotation direction of the cutting tap 1. The groove bottom diameter $d_3$ reliefs are set to be smaller than the major diameter reliefs of the thread ridges 5, and to be larger than the effective diameter $d_1$ reliefs of the thread ridges 5. By setting the groove bottom diameter $d_3$ reliefs to be smaller than the major diameter reliefs of the thread ridges 5, the cutting tap 1 can be guided accurately. The groove bottom diameter $d_3$ reliefs may be set, for example, to be about $2/5$ to $4/5$ of the major diameter reliefs of the thread ridges 5. By setting the groove bottom diameter $d_3$ reliefs to be larger than the effective diameter $d_1$ reliefs of the thread ridges 5, it is possible to ensure sharpness of cutting when the deburring thread grooves 10 deburr/cut a prepared hole 11 (see FIG. 5) to form an internal thread thereon, and to reduce the rotational resistance of the cutting tap 1.

The above cutting tap 1 can be manufactured, for example, as follows: First, the grooves 7 are formed in the outer periphery of a tap blank having a round rod shape. Second, the thread ridges 5 of the cutting portion 2 and the thread ridges 6 of the complete thread portion 3 are formed by removing, from the outer periphery of the tap blank, portions corresponding to the thread grooves between respective axially adjacent pairs of the thread ridges 5, and portions corresponding to the thread grooves between respective axially adjacent pairs of the thread ridges 6. At this time, the thread ridges 5 and 6 are formed such that the effective diameter $d_1$ reliefs of the thread ridges 5 and 6 are set at 0 (zero) or a minute value. Third, the crests of the respective thread ridges 5 of the cutting portion 2 are obliquely cut. At this time, these crests are cut such that the major diameter reliefs of the thread ridges 5 of the cutting portion 2 are larger than the effective diameter $d_1$ reliefs of the thread ridges 5. Lastly, the deburring thread grooves 10 are formed in some of the roots 8, between respective adjacent pairs of the thread ridges 5, and in the areas located axially forward of the frontmost thread ridges 5 at the axial front end of the cutting portion 2. At this time, the deburring thread grooves 10 are formed such that the groove bottom diameter $d_3$ reliefs of the thread grooves 10 are larger than the effective diameter $d_1$ reliefs of the thread ridges 5.

Figure 5:
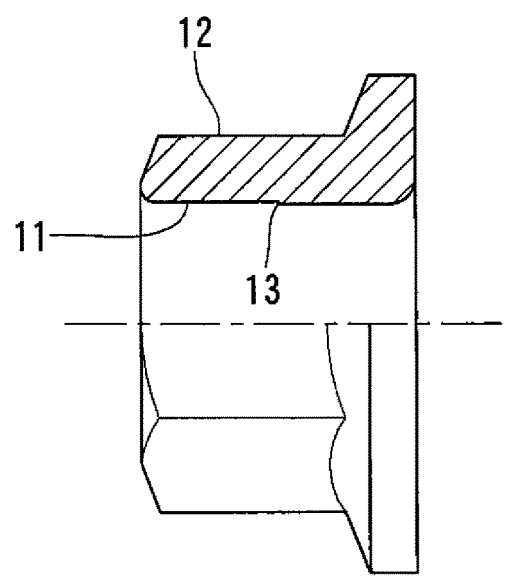
FIG. 5 is a sectional view of a portion of a nut blank.

It is now described how an internal thread is formed by the cutting tap 1 in the inner periphery of a nut blank 12 illustrated in FIG. 5. The nut blank 12 is formed by forging or pressing, and formed in its center with the prepared hole 11. The prepared hole 11 comprises a through hole having a cylindrical inner peripheral surface. Though it is ideal that the inner diameter of the prepare hole 11 is uniform in the axial direction, it is difficult to make the inner diameter thereof uniform in a strict sense, because an error tends to occur when the nut blank 12 is manufactured. In the nut blank 12 illustrated in FIG. 5, the inner diameter of the prepared hole 11 varies midway. Namely, a minute step 13 varies the inner diameter of the nut blank 12 by 0.1 mm or over (e.g. by about 0.2 mm) in diameter. The inner diameter of the prepared hole 11 is smaller over its entire area than the root diameter $d_2$ of the cutting tap 1.

Figure 6:
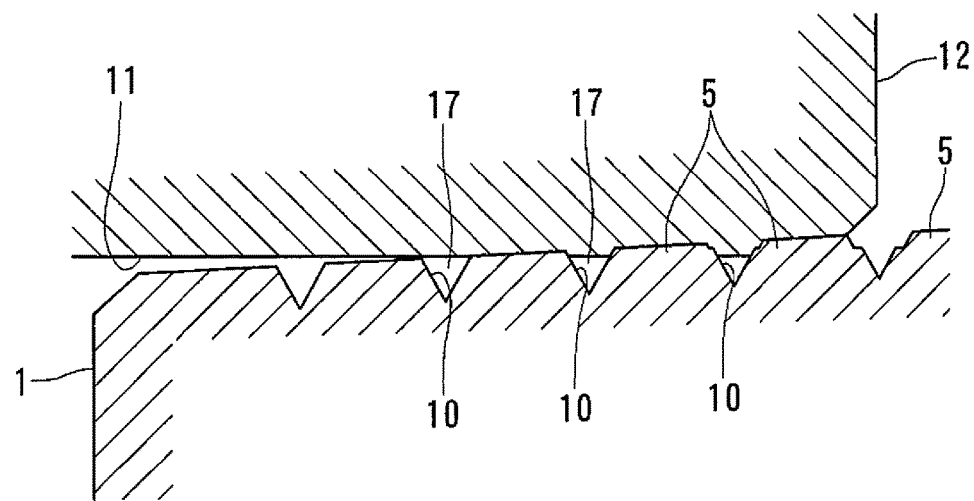
FIG. 6 is a sectional view illustrating the state in which the front end portion of the cutting tap of FIG. 3 is engaged with the inner periphery of the nut blank of FIG. 5.

When the front end of the cutting tap 1 is inserted in this nut blank 12, and the cutting tap 1 is axially advanced while being rotated, as illustrated in FIG. 6, the portions of the cutting tap 1 located axially forward of the frontmost thread ridges 5 at the axial front end of the cutting tap 1 engage with the inner periphery of the prepared hole 11. At this time, the deburring thread grooves 10 located axially forward of the frontmost thread ridges 5 also engage with the inner periphery of the prepared hole 11.

Figure 7:
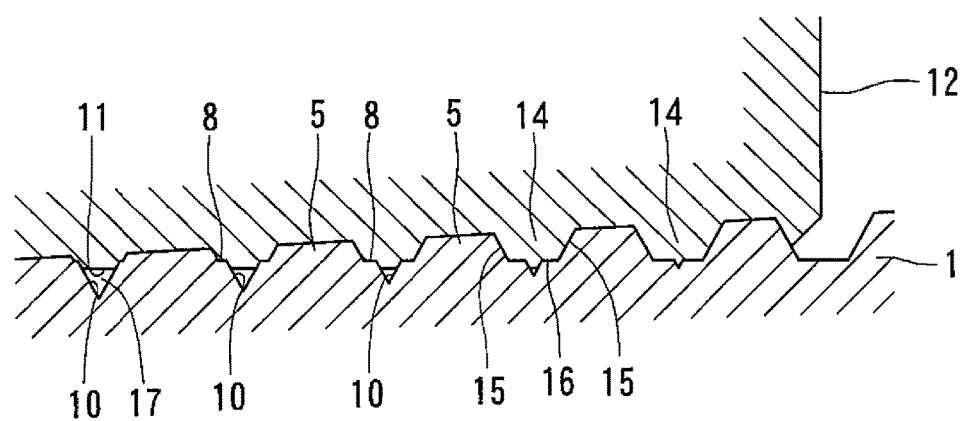
FIG. 7 is a sectional view illustrating the state in which the cutting tap of FIG. 6 is advanced while being rotated.

When the cutting tap 1 is further axially advanced while being rotated, as illustrated in FIG. 7, the thread ridges 5 of the cutting portion 2 engage with the prepared hole 11 for an internal thread, and cut/remove portions corresponding to the thread grooves of the internal thread, thereby forming surfaces corresponding to flanks 15 of thread ridges 14 of the internal thread. Concurrently with this, the deburring thread grooves 10 gradually deburr/cut the inner periphery of the prepared hole 11. The closer the deburring thread grooves 10 are located to the axial rear side of the cutting portion 2, the shallower/smaller the deburring thread grooves 10 are. As a result thereof, the closer the roots 8 are located to the axial rear side of the cutting portion 2, the deeper/larger the roots 8 are. According to the depths/sizes of the roots 8, surfaces corresponding to the crests 16 of the thread ridges 14 of the internal thread are formed by degrees. At this time, since the major diameter reliefs of the crests of the thread ridges 5 and the groove bottom diameter $d_3$ reliefs of the deburring thread grooves 10 are larger than the effective diameter $d_1$ reliefs of the thread ridges 5, the rotational resistance of the cutting tap 1 is not made extremely large. Also, spaces 17 are defined between the inner periphery of the prepared hole 11 and the respective inner surfaces of the deburring thread grooves 10. Therefore, due to cutting oil flowing into the spaces 17, it is possible to effectively reduce the rotational resistance of the cutting tap 1.

Figure 8:
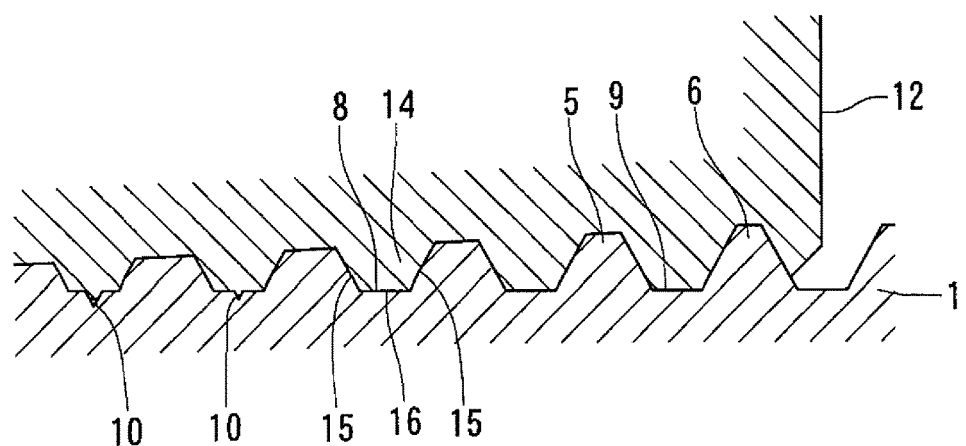
FIG. 8 is a sectional view illustrating the state in which the cutting tap of FIG. 7 is further advanced while being rotated.

When the cutting tap 1 is still further axially advanced while being rotated, as illustrated in FIG. 8, the rearmost deburring thread grooves 10 at the axial rear end of the cutting portion 2 (strictly speaking, the roots 8 located axially rearward of the rearmost deburring thread grooves 10) pass the crests 16 of the thread ridges 14 of the internal thread, so that the crests 16 are completely formed. Also, the rearmost thread ridges 5 at the axial rear end of the cutting portion 2 (strictly speaking, the thread ridges 6 having a complete shape and located axially rearward of the rearmost thread ridges 5) pass the flanks 15 of the thread ridges 14 of the internal thread, so that the flanks 15 are completely formed.

This cutting tap 1 is configured such that when the cutting tap 1 is axially advanced while being rotated, the deburring thread grooves 10 deburr/cut the inner periphery of the prepared hole 11. Since the groove bottom diameter $d_3$ reliefs of the deburring thread grooves 10 are larger than the effective diameter $d_1$ reliefs of the thread ridges 5, the rotational resistance of the cutting tap 1 is not made extremely large. As a result thereof, the cutting tap 1 can cut the inner periphery of the prepared hole 11 with a relatively large cutting stock, and thus can form an internal thread with high accuracy even when the prepared hole 11 has an inner periphery of which the dimensional accuracy is low.

Since this cutting tap 1 uses the deburring thread grooves 10, each of which comprises a V groove having a V-shaped cross section such that a step or steps are formed relative to the surface of the corresponding root 8, when the cutting tap 1 is manufactured, it is possible to separately form the deburring thread grooves 10, and the flanks of the thread ridges 5 on the outer periphery of the cutting tap 1. Therefore, it is possible to easily form the deburring thread grooves 10 such that the groove bottom diameter $d_3$ reliefs of the thread grooves 10 are made larger than the effective diameter $d_1$ reliefs of the thread ridges 5.

Figure 9:
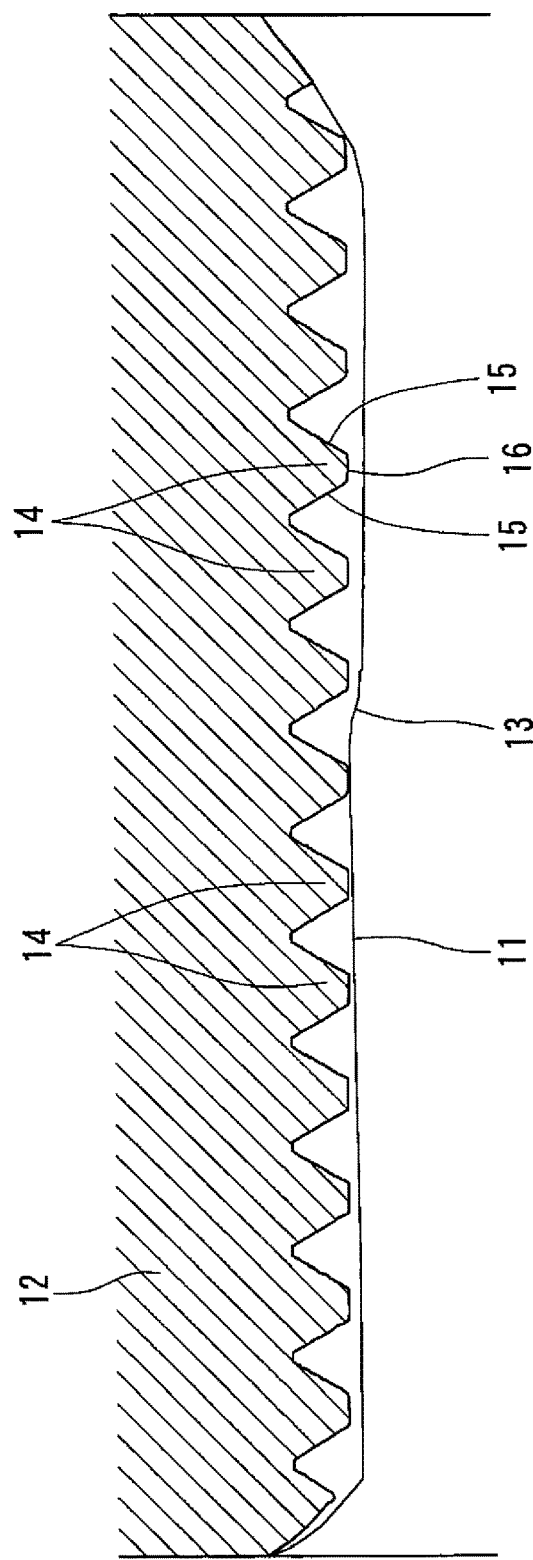
FIG. 9 is a sectional view illustrating, when a first experiment was performed so as to form an internal thread by use of the cutting tap of FIG. 4, the actual shape of the prepared hole for the internal thread, and the actual shape of the internal thread.
Figure 10:
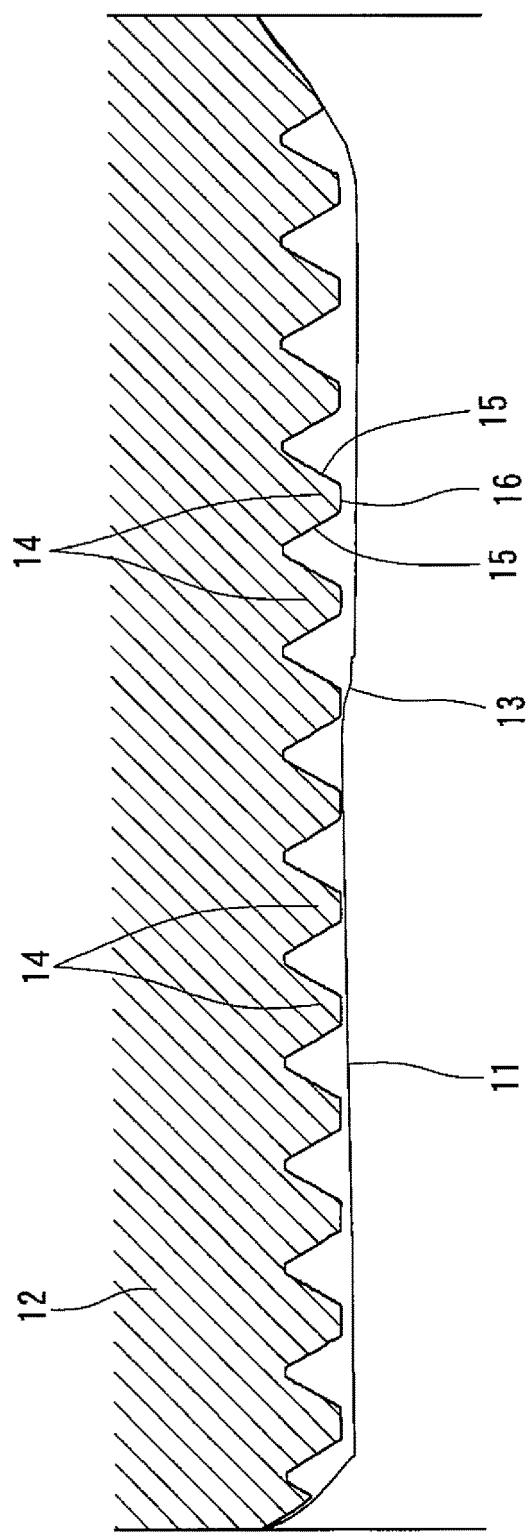
FIG. 10 is a sectional view illustrating, when a second experiment was performed so as to form an internal thread by use of the cutting tap of FIG. 4, the actual shape of the prepared hole for the internal thread, and the actual shape of the internal thread.

An experiment was performed to confirm that the cutting tap 1 of the above embodiment can form an internal thread with high accuracy in the prepared hole 11 having an inner periphery of which the dimensional accuracy is low. FIGS. 9 and 10 illustrate the actual shape of the prepared hole 11 of the nut blank 12 used in this experiment, and the actual shape of the internal thread formed in this prepared hole 11 by the cutting tap 1. The inner diameter of the prepared hole 11 varies midway. Namely, the minute step 13 varies the inner diameter of the nut blank 12 by about 0.4 mm (in diameter). The pitch of the thread ridges 14 of the internal thread is 1.5 mm. As can be seen from FIGS. 9 and 10, the cutting tap 1 of the above embodiment can cut the inner periphery of the prepared hole 11 with a relatively large cutting stock, specifically, 0.4 mm or over in diameter, and thus can form an internal thread with high accuracy even when the prepared hole 11 has an inner periphery of which the dimensional accuracy is low.

DESCRIPTION OF REFERENCE NUMERALS

1: cutting tap
5: thread ridge
8: root
10: deburring thread groove
$d_1$: effective diameter of the thread ridges 5
$d_2$: root diameter
$d_3$: groove bottom diameter

The invention claimed is:
1. A cutting tap comprising:
 a plurality of thread ridges arranged at a constant thread ridge pitch along an axial direction of the cutting tap, the thread ridges being formed such that an effective diameter of the thread ridges is uniform along the axial direction, and such that a major diameter of the thread ridges gradually decreases in a direction toward an axial front side of the cutting tap, the effective diameter of the thread ridges being defined as a diameter of an imaginary cylinder passing through a portion of each of the thread ridges at a location where a width of the portion of each respective one of the thread ridges is equal to a width of a thread groove adjacent to the respective one of the thread ridges; and roots formed between respective axially adjacent pairs of the thread ridges, wherein the respective thread ridges have effective diameter reliefs by which the effective diameter gradually decreases from a leading side toward a trailing side of each of the thread ridges in a rotation direction of the cutting tap, and wherein the respective roots have root diameter reliefs by which a root diameter of the roots gradually decreases from a leading side toward a trailing side of each of the roots in the rotation direction of the cutting tap, the root diameter reliefs being equal to the effective diameter reliefs, wherein the cutting tap further comprises a plurality of deburring thread grooves formed in at least some of the roots and spaced at a constant deburring thread groove pitch along the cutting tap such that a groove bottom diameter of the deburring thread grooves gradually decreases toward the axial front side of the cutting tap, and wherein the respective deburring thread grooves have groove bottom diameter reliefs by which the groove bottom diameter gradually decreases from a leading side toward a trailing side of each of the deburring thread grooves in the rotation direction of the cutting tap, the groove bottom diameter reliefs being set to be larger than the effective diameter reliefs of the thread grooves.

2. The cutting tap according to claim 1, wherein each of the deburring thread grooves is a V groove having a V-shaped cross section such that a step is formed relative to a surface of the corresponding one of the roots.

3. The cutting tap according to claim 1, wherein the deburring thread grooves are arranged and shaped such that the closer the deburring thread grooves are located to the axial front side of the cutting tap, the deeper the deburring thread grooves are relative to the roots.

4. The cutting tap according to claim 2, wherein the deburring thread grooves are arranged and shaped such that the closer the deburring thread grooves are located to the axial front side of the cutting tap, the deeper the deburring thread grooves are relative to the roots.

* * * * *